United States Patent [19]

Matsumoto et al.

[11] Patent Number: 4,811,993
[45] Date of Patent: Mar. 14, 1989

[54] ANTI-SKID CONTROL SYSTEM FOR BRAKING OF VEHICLE

[75] Inventors: Naoki Matsumoto, Kariya; Hiroaki Kuraoka, Oobu; Naoto Ohoka, Toyohashi; Masahiro Ohba, Okazaki, all of Japan

[73] Assignee: Nippondenso Co., Ltd., Kariya, Japan

[21] Appl. No.: 109,178

[22] Filed: Oct. 16, 1987

[30] Foreign Application Priority Data

Oct. 17, 1986 [JP] Japan ............................ 61-247959

[51] Int. Cl.$^4$ .............................................. B60T 8/10
[52] U.S. Cl. ....................................... 303/100; 303/94; 303/106; 303/109; 303/112
[58] Field of Search ................... 303/100, 112, 97, 99, 303/94, 106, 109

[56] References Cited

U.S. PATENT DOCUMENTS 4,392,202 7/1983 Matsuda .............................. 303/100
4,653,815 3/1987 Agarwal et al. .................... 303/100

OTHER PUBLICATIONS

"Mechanical System Control", by Katsuhisa Furuta; published by Omu Sha.
"Lenear Optimal Control Systems", by Buibert Kwakernaak and Raphael Sivan Wiley-Interscience: pp. 200-221.

Primary Examiner—Andres Kashnikow
Assistant Examiner—Mark T. Le
Attorney, Agent, or Firm—Cushman, Darby & Cushman

[57] ABSTRACT

An anti-skid control system for a vehicle with at least one wheel. The anti-skid control system includes a wheel sensor for sensing a rotational speed of the wheel and for generating a signal indicative of the sensed wheel speed and a brake sensor for sensing a braking force of a braking device which brakes the wheel and for generating a signal indicative of the sensed braking force. The wheel sensor and the brake sensor are respectively coupled to a control unit for receiving the wheel speed signal and the braking force signal to control the braking force of the braking device to a target braking force so that a slip ratio of the wheel assumes a predetermined value. The control unit determines the target braking force at the time of start of the anti-skid control to be equal to a braking force corresponding to the resultant of torques developed in the wheel at the control start time.

3 Claims, 8 Drawing Sheets

ANTI-SKID CONTROL SYSTEM FOR BRAKING OF VEHICLE

BACKGROUND OF THE INVENTION

The present invention relates generally to anti-skid control systems for use in motor vehicles, and more particularly to such an anti-skid control system arranged so as to optimally determine the initial target braking hydraulic pressure at the time of start of the anti-skid control.

Known is a braking apparatus with a hydraulic pressure braking device in which in order to keep the slip ratio of a vehicle wheel to the vicinity of a predetermined value, a target braking hydraulic pressure is calculated and the hydraulic pressure supplied to the hydraulic pressure braking device is controlled to become equal to the calculated target value. In such an anti-skid control apparatus, the initial target value is determined to assume the hydraulic pressure in the hydraulic pressure braking device at the time of start of the anti-skid control; that is, the target hydraulic pressure thereafter is successively calculated on the basis of the hydraulic presure therein on the start of anti-skid control, resulting in taking a long time to bring the hydraulic pressure to the optimum value. Furthermore, due to the time lag on response, the hydraulic pressure in the hydraulic pressure braking device reaches the target hydraulic pressure with overshooting so that the wheel speed is rapidly decreased for a time period from the start of control and then settled to assume a desirable slip ratio with undershooting, resulting in uncomfortable ride of the motor vehicle.

SUMMARY OF THE INVENTION

The present invention has been developed in order to eliminate the disadvantage inherent to the conventional anti-skid control apparatus.

It is therefore an object of the present invention to provide a new and improved anti-skid control apparatus which is capable of sufficiently preventing the undershoot of a vehicle wheel speed so as to give more comfortable ride.

A feature of the present invention is that the anti-skid control system includes a wheel sensor for sensing a rotational speed of the wheel and for generating a signal indicative of the sensed wheel speed and a brake sensor for sensing a braking force of a braking device which brakes the wheel and for generating a signal indicative of the sensed braking force. The wheel sensor and the brake sensor are respectively coupled to a control unit for receiving the wheel speed signal and the braking force signal to control the braking force of the braking device to a target braking force so that a slip ratio of the wheel assumes a predetermined value. The control unit determines the target braking force at the time of start of the anti-skid control to be equal to a braking force corresponding to the resultant of torques developed in the wheel at the control start time whereby the variation of the target braking force is stable to prevent the undershooting of the wheel speed.

In accordance with the present invention, there is provided an anti-skid control system for a vehicle with at least one wheel which is arranged to be braked by braking means, comprising: wheel sensor means for sensing a rotational speed of the wheel and for generating a signal indicative of the sensed wheel speed; brake sensor means for sensing a braking force of the braking means and for generating a signal indicative of the sensed braking force; and control means responsive to the wheel speed signal and the braking force signal for controlling the braking force to a target braking force so that a slip ratio of the wheel assumes a predetermined value, the control means including: control start determining means for determining start of the anti-skid control; and initial braking force determining means for determining the initial target braking force on the basis of torques developed in the wheel at the time of the determination of the control start.

Preferably, the initial braking force determining means, in response to the determination of the control start determining means, calculates a rotational torque of the wheel on the basis of an acceleration value of the wheel and a braking torque, applied to the wheel, on the basis of the braking force sensed by the brake sensor means and determines the initial target braking force on the basis of the resultant (vector addition) of the calculated rotational torque and braking torque. More preferably, the initial braking force determining means calculates a frictional force by combining the calculated rotational torque with the calculated braking torque and determining the initial target braking force so as to develop a braking torque which is equal to the calculated frictional force.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
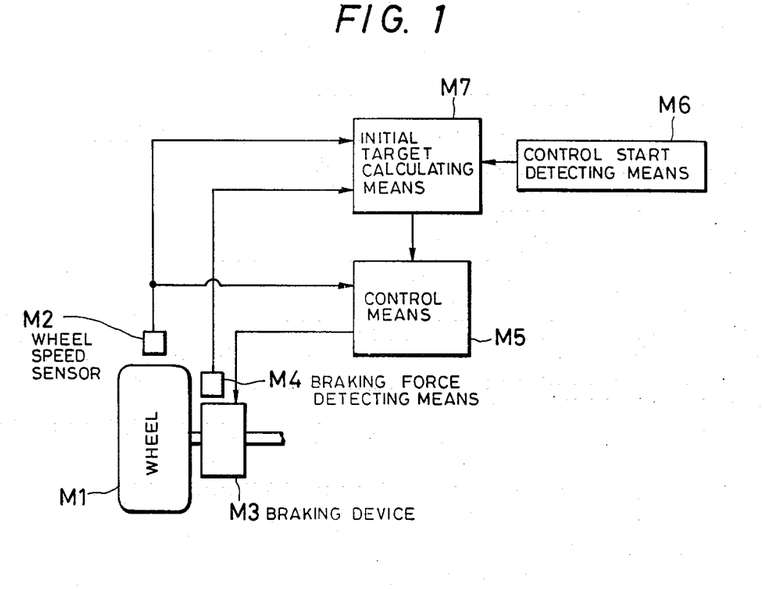
FIG. 1 is a block diagram showing the basic arrangement of an embodiment of the present invention.

Referring first to FIG. 1 for a better understanding of the present invention, there is schematically illustrated the basic arrangement of an anti-skid control apparatus according to an embodiment of the present invention which is incorporated into a motor vehicle. As shown in the FIG. 1, the anti-skid control apparatus includes a wheel speed sensor M2 for sensing the speed of a wheel M1 and a braking force detecting means M4 for detecting a braking force applied to a braking device M3 for braking the wheel M1. The braking device M3 is coupled to a control means M5 where the braking force is controlled on the basis of the sensed wheel speed to cause the slip ratio of the wheel M1 to assume a predetermined value. Also included in the anti-skid control apparatus is an initial target value calculating means M7 for determining the initial target braking force on the basis of a wheel speed signal from the wheel speed sensor M2 and a braking force signal from the braking force detecting means M4 in response to the start of anti-skid control which is detected by a control start detecting means M6. The initial target braking force is determined so as to be equal to the braking force corresponding to the resultant, or combination, of the rotational torque and the braking torque of the wheel M1 developed at the time of the control start. More specifically, with reference to FIG. 2, the frictional torque Tf of the wheel M1 due to the friction with a road surface is the resultant of the braking torque Tb developed due to the braking of the wheel M1 and the rotational torque Tr developed by the rotational acceleration of the wheel M1. The initial target value calculating means M7 determines the initial target braking force so as to generate a braking torque equal to the friction torque Tf whereby the target braking force is varied from the braking force corresponding to the friction torque Tf. Therefore, the variation of the target braking force is relatively stable, improving the follow-up of the braking force to the target braking force and sufficiently preventing the undershoot of wheel speed and hence reducing vibration of the motor vehicle due to the undershoot.

Figure 3:
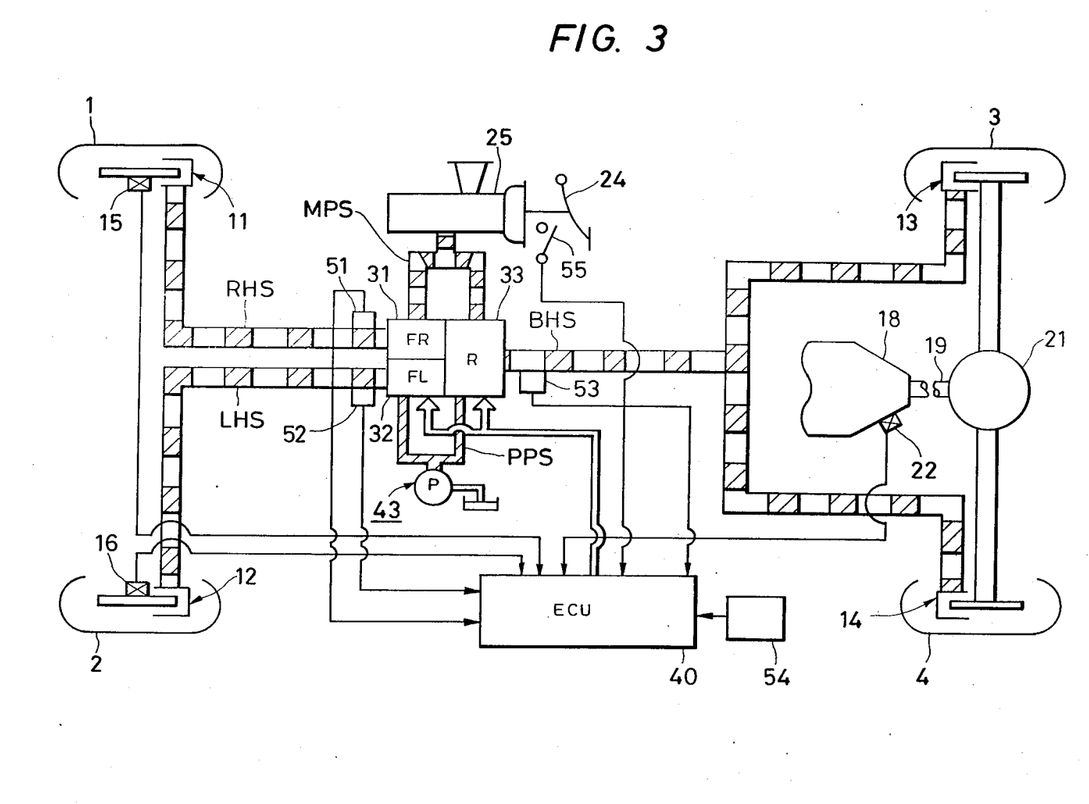
FIG. 3 is a schematic diagram showing the entire arrangement of the embodiment.
Figure 4:
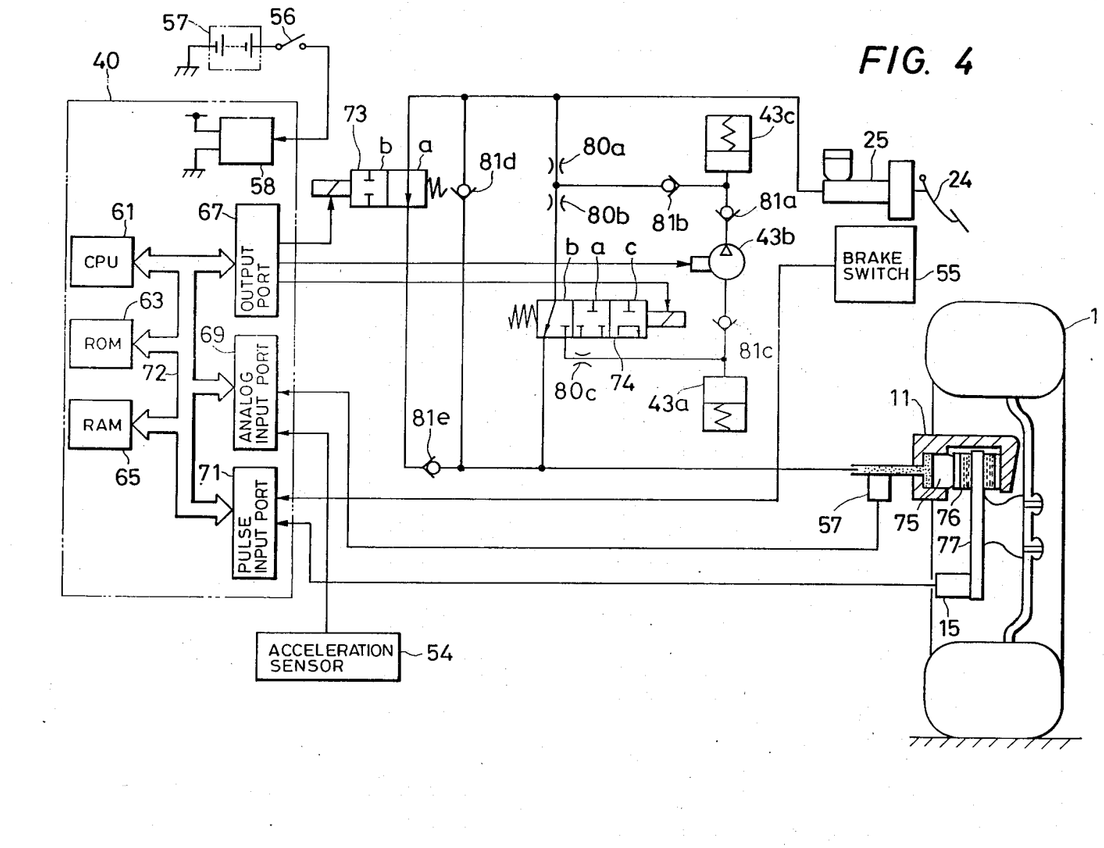
FIG. 4 shows a braking system provided for braking control of the front-right wheel.

A detailed description of the embodiment of the present invention will be described hereinbelow. FIG. 3 is an illustration showing the entire arrangement of a braking control apparatus according to the embodiment of the invention which is incorporated into a motor vehicle with four wheels and FIG. 4 is an illustration of a hydraulic pressure control system provided for the front-right wheel. In FIGS. 3 and 4, hydraulic pressure braking devices 11, 12, 13, 14 are respectively provided for wheels 1, 2, 3, 4 of the motor vehicle so as to apply braking forces thereto. The front wheels 1, 2 are respectively equipped with electromagnetic pickup type wheel speed sensors 15, 16 for sensing the rotational speeds thereof, respectively. The rotational speed of the rear wheels 3, 4 are sensed by a wheel speed sensor 22 provided on a transmission 18, the rotation of the rear wheels 3, 4 being made through a differential gear 21 in accordance with rotation of the main shaft of the transmission 18.

The hydraulic pressure braking devices 11 through 14 perform the braking of the wheels 1 to 4 using the high hydraulic pressure generated by a tandem type master cylinder 25 which is operatively coupled to a brake pedal 24 of the motor vehicle. The braking hydraulic pressure delivered from the master cylinder 25 through a hydraulic pressure system MPS is regulated by actuators 31, 32, 33. The actuators 31, 32, 33 independently control the braking hydraulic pressures applied to the front-right wheel 1, front-left wheel 2 and rear wheels 3, 4 under control of an electric control unit (ECU) 40. The acutaors 31, 32, 33, the arrangements of which will be described hereinafter, respectively regulate the braking hydraulic pressures for the wheels 1 to 4 using the hydraulic pressure from a hydraulic pressure generating device 43. The braking pressure of a hydraulic pressure system RHS applied to the front-right wheel 1 is detected by a hydraulic pressure sensor 51 and the braking pressure of a hydraulic pressure system LHS applied to the front-left wheel 2 is detected by a hydraulic pressure sensor 52 and the braking pressure of a hydraulic pressure system BHS applied to the rear wheel 3, 4 is detected by a hydraulic pressure sensor 53.

The ECU 40 is responsive to signals indicative of the hydraulic pressure values from the hydraulic pressure sensors 51, 52, 53, signals indicative of wheels speeds from the wheel speed sensors 15, 16, 22, a signal from an acceleration sensor 54 for detecting the acceleration (or deceleration) of the motor vehicle, a signal from a brake switch 55 for detecting the operation of the brake pedal 24, and so on to respectively control the actuators 31, 32, 33 for controlling the wheel speeds of the respective wheels 1 through 4. The control of the braking force is performed independently for the front-right wheel 1, front-left wheel 2 and rear wheels 3, 4, and therefore a description of the braking force control will be hereinbelow described only for front-right wheel 1 with reference to FIG. 4. As illustrated in FIG. 4, the ECU 40 has a power circuit 58 coupled through an ignition key 56 to a battery 57 for supplying a constant voltage to the whole unit, and includes a central processing unit (CPU) 61, a read only memory (ROM) 63, a random access memory (RAM) 65, an output port 67, an analog input port 69, a pulse input port 71 and so on which are coupled through a common bus 72 therebetween. The ECU 40 is constructed as an arithmetic and logic circuit.

The actuator 31 comprises a by-pass valve 73 and a three-position valve 74. The by-pass valve 73 is provided in a passage between the master cylinder 25 and the hydraulic pressure braking device 11 and is arranged to cut off the passage in accordance with an instruction from the ECU 40. The three-position valve 74 has a first position a for maintaining the hydraulic pressure in the hydraulic pressure braking device 11, a second position b for increasing the hydraulic pressure therein and a third position c for decreasing the hydraulic pressure therein, and normally biased to the second position b. The hydraulic pressure generating device 43 pressures a braking oil in a reservoir 43a by means of a pump 43b and supplies the pressured braking oil through an accumulator 43c to the three-position valve 74. The high hydraulic pressure from the hydraulic pressure generating device 43 is supplied to the hydraulic pressure braking device 11 when the three-position valve 74 takes the second position b and the hydraulic pressure in the hydraulic pressure braking device 11 is released toward the reservoir 43a when the three-position valve 74 takes the third position c. The hydraulic pressure braking device 11 is arranged so that a piston 75 is pushed out by the supplied hydraulic pressure to cause a braking pad 76 to come into contact with a disc plate 77 of the wheel 1 to brake the wheel 1. In FIG. 4, reference numerals 80a, 80b, 80c respectively represent orifices and numerals 81a, 81b, 81c, 81d, 81e respectively designate check valves.

In operation of the FIG. 4 braking system, in response to depression of the brake pedal 24 by the vehicle driver, a hydraulic pressure is generated in the master cylinder 25 and supplied through the by-pass valve 73 to the hydraulic pressure braking device 11 to brake the wheel 1. The ECU 40 detects, on the basis of the signal from the wheel speed sensor 15, the fact that the slip ratio of the wheel exceeds a predetermined value and the wheel 1 is apt to be locked due to the strong braking force and the ECU 40 starts the braking control in response to the detection. The pump 43a is first driven (it is also appropriate that the pump 43a is operated normally to keep the pressure of the accumulator 43c to a constant value), and by-pass valve 73 is driven to take the second position b so as to cut off the passage between the master cylinder 25 and the hydraulic pressure braking device 11, whereby the master cylinder 25 is coupled through the three-position valve 74 and the orifices 80a, 80b to the hydraulic pressure braking device 11. Thereafter, during the depression of the brake pedal 24, the ECU 40 calculates a target wheel speed Vw* to assume the shortest brake distance and calculates a command hydraulic pressure and control the three-position valve 74 so that the wheel speed Vw of the wheel 1 becomes equal to the target wheel speed Vw*. The control of the three-position valve 74 is performed by switching operation among the first position a, second position b and third position c so that the hydraulic pressure in the hydraulic pressure braking device 11 is maintained, increased or decreased to cause the braking hydraulic pressure to become equal to the command hydraulic pressure. Here, in the description, the hydraulic pressure braking device 11 coresonds to the braking device M3 in FIG. 1, the braking force corresponds to the hydraulic pressure in the hydraulic pressure braking device 11, the command hydraulic pressure corresponds to the target braking force in the description made with reference to FIGS. 1 and 2, and the initial target braking force reads on an initial command hydraulic pressure.

Figure 2:
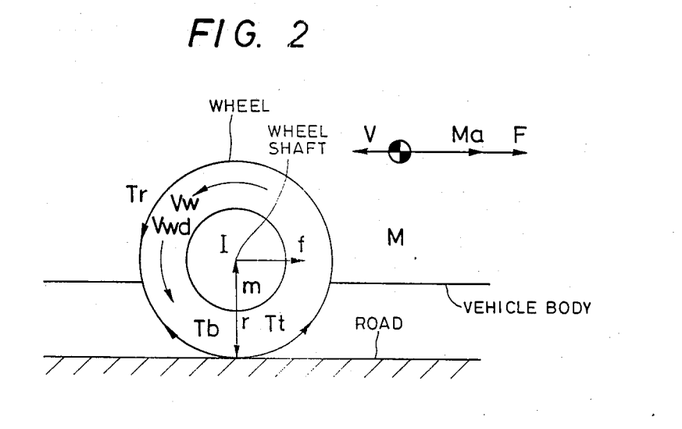
FIG. 2 is an illustration useful for describing the present invention.
Figure 5:
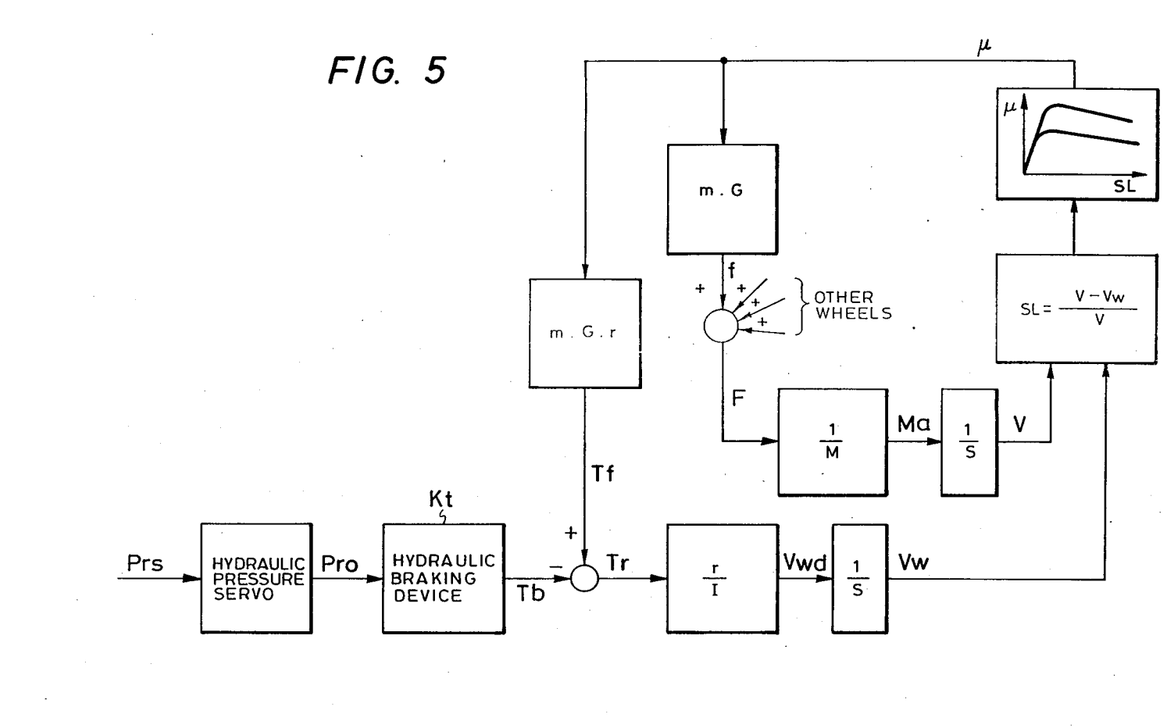
FIG. 5 is a signal flow diagram showing a dynamic model of the braking system in the embodiment.

A further detailed description will hereinbelow be made in terms of the control executed by the ECU 40 with reference to FIGS. 2, 5. FIG. 5 is a signal flow chart for describing the braking system. In FIG. 5, the reference 1/S represents the time integral operation and the reference S represents the time differential operation.

In response to a command signal indicative of a command hydraulic pressure prs from the ECU 40, a hydraulic pressure servo, i.e., braking system including the actuators 31 to 33, supplies a hydraulic pressure pro to the hydraulic pressure braking device which in turn generates a braking torque Tb. The braking torque Tb is determined on the basis of the hydraulic pressure pro and a coefficient Kt which is determined in accordance with the structure and characteristic of the hydraulic pressure braking device. On the other hand, when the wheel is rotated at a steep Vw and the motor vehicle is driven at a speed V, the slip ratio is calculated as (V−Vw)/V and the frictional coefficient $\mu$ between the road and the wheel is determined in accordance with the non-linear operation. The frictional torque Tf of the wheel resulting from the road is determined on the basis of the frictional coefficient $\mu$, vehicle mass m per one wheel, gravitational acceleration G and effective radius r of the wheel. The rotational torque Tr of the wheel is obtained as the difference between the frictional torque Tf and the braking torque Tb, and the rotational acceleration Vwd of the wheel is determined on the basis of the rotational torque Tr, effective radious r of the wheel and rotational monent of inertia I of the wheel, and the wheel speed Vw is obtained by the integral operation of the rotational acceleration Vwd. Furthermore, the force f applied to the shaft of the wheel is determined on the basis of the frictional coefficient $\mu$, vehicle mass m and gravitational acceleration G. Since the force f is the force received from one wheel, the force F applied to the vehicle is obtained as the sum of the forces f received from all of the wheels. The vehicle acceleration Ma is obtained by dividing the force F by the vehicle mass M and the vehicle speed V is obtained by the integral operation of the vehicle acceleration Ma.

Turning back to FIG. 2 wherein the motor vehicle is driven at a speed V in the direction indicated by an arrow and the wheel is rotated at a speed Vw in the direction indicated by an arrow, the reference character r represents the effective radius of the wheel and I designates the moment of inertia and, in terms of the speeds, accelerations and forces, the directions indicated by arrows are positive. Tf is the frictional torque due to the friction of the wheel against the road, Tb is the braking torque which is obtained when the hydraulic pressure braking device is operated to produce a predetermined braking force, and Tr is the total rotational torque applied to the wheel which is in the rotating state.

The rotational torque Tr can be expressed on the basis of the rotational acceleration Vwd of the wheel as follows.

$$Tr = (I/r) \cdot Vwd \tag{1}$$

The braking torque Tb can be expressed as follows on the basis of a braking force P of the hydraulic pressure braking device and a braking force-torque conversion coefficient k.

$$Tb = P \cdot K \tag{2}$$

The frictional torque Tf can be obtained as follows in accordance with the equations (1) and (2) and in the equilibrium of the respective torques.

$$Tf = P \cdot K + (I/r) \cdot Vwd \tag{3}$$

In the present invention, since the braking force which generates the braking torque Tb equal to the frictional torque Tf is determined as the initial target braking force, the equation (3) is rewritten as follows to express the braking force.

$$Tf/K = P + (I/r \cdot K) \cdot Vwd \tag{4}$$

The control system will be described hereinbelow. In this embodiment, the state feedback is performed by an optimal requlator based on so-called modern control theory. First, a method of the optimal feedback in this embodiment will be described briefly. A detailed description of the modern control theory will be omitted because it is described in detail in documents such as "Linear System Control Theory" written by Katsuhisa FURUTA published by Shokodo Japan in 1976 and "Mechanical System Control" written by Katsuhisa FURUTA published by Omu Sha Japan in 1984. In the following description, the references x, y, u, A, B, C, F, S, Q, R, G1, G2 indicate vectors (matrix), a superscript $T$ such as $A^T$ indicates transposed matrix and a superscript $-1$ such as $A^{-1}$ indicates inverse matrix. In this embodiment, the control system comprises the ECU 40 and is a sampled data control system which perform the sampling at a predetermined time interval. In such a sampled data control system, when state variables representing the internal state of a controlled object are indicated by x(k), control input variables for the controlled object are indicated by u(k) and control output variables of the controlled object are indicated by y(k), the relationships thereamong are expressed as follows.

$$x(k+1) = A \cdot x(k) + B \cdot u(k) \tag{5}$$

$$y(k) = C \cdot x(k) \tag{6}$$

where, subscript "k" indicates that the sampled value is of the present time, while "k−1" indicates that the sampled value is of the time immediately preceding the present time.

Here, if the dynamic model of the controlled object is known to obtain the matrixs A, B, C, the feedback amount can be obtained on the basis of the state variables x(k), control outputs y(k) and control target values y(k) so that the control input variables u(k) is determined so as to control the control outputs y(k) to the control target values y(k), resulting in the optimal control of the controlled object. The controlled object in this embodiment, i.e., the dynamic model of the braking system, is constructed as shown in FIG. 5 in accordance with the equation of motion and so on.

In this embodiment, it is required to perform the control for cancelling the steady-state error between the target value of the control output and an actual control output value, and therefore the difference between the target value and the output value is integrated and then added to the state variables x(k) to expand the system. In this embodiment, the state variables x(k), control input variables u(k) and control outputs y(k) are treated as follows.

$$x(k) = \begin{bmatrix} Vwd \\ Vw \\ INT\Delta Vw \end{bmatrix} \quad (7)$$

$$u(k) = [prs] \quad (8)$$
$$y(k) = [Vw] \quad (9)$$

A description will hereinbelow be made in terms of the optimal feedback gain F. In this embodiment, the feedback gain F is obtained in accordance with the following equation (10).

$$F = -(R + B^T \cdot S \cdot B)^{-1} \cdot B^T \cdot S \cdot A \quad (10)$$

where S is a solution of the following Riccati equation (11).

$$S = A^T \cdot S \cdot A - A^T \cdot S \cdot B (B^T \cdot S \cdot B + R)^{-1} \cdot B^T \cdot S \cdot A + Q \quad (11)$$

where Q, R are parameters which are selected as the optimal values in a simulation performed by a computer so that the performance function J expressed by the following equation (12) is minimum.

$$J = \sum_{k=0}^{\infty} [x^T(k+1) \cdot Q \cdot x(k+1) + U^T(k+1) \cdot R \cdot u(k+1)] \quad (12)$$

In this embodiment, the sumilation is repeatedly performed with changing the parameters Q, R, and the optimal parameters are determined on the basis of behavior of the braking system obtained in the simulation. In accordance with the determination of the optimal feedback gain F, the control input u(k+1) can be expressed by the following equation (13).

$$u(k+1) = -F \cdot x(k+1) \quad (13)$$

Here, x(k+1) cannot be used directly because of response time lag of the control system, and therefore the control input u(k+1) is obtained as follows by substituting the right side of the equation (5).

$$u(k+1) = -\{F \cdot A \cdot x(k) + F \cdot B \cdot u(k)\} \quad (14)$$

When G1=F·A, G2=F·B, the equation (14) is re-written as follows.

$$u(k+1) = -\{G1 \cdot x(k) + G2 \cdot u(k)\} \quad (14')$$

In this embodiment, G1 and G2 are determined as follows from F, A, B.

$$G1 = [66.85 \ 723.4 \ 3162.3]$$

$$G2 = [-18.49] \quad (15)$$

It is also appropriate that G1 and G2 are predetermined in accordance with the vehicle speed and are changed in accordance with the variation of the vehicle speed. For example, these parameters are determined so that the speed of convergence of the system is decreased as the vehicle speed decreases.

Figure 6:
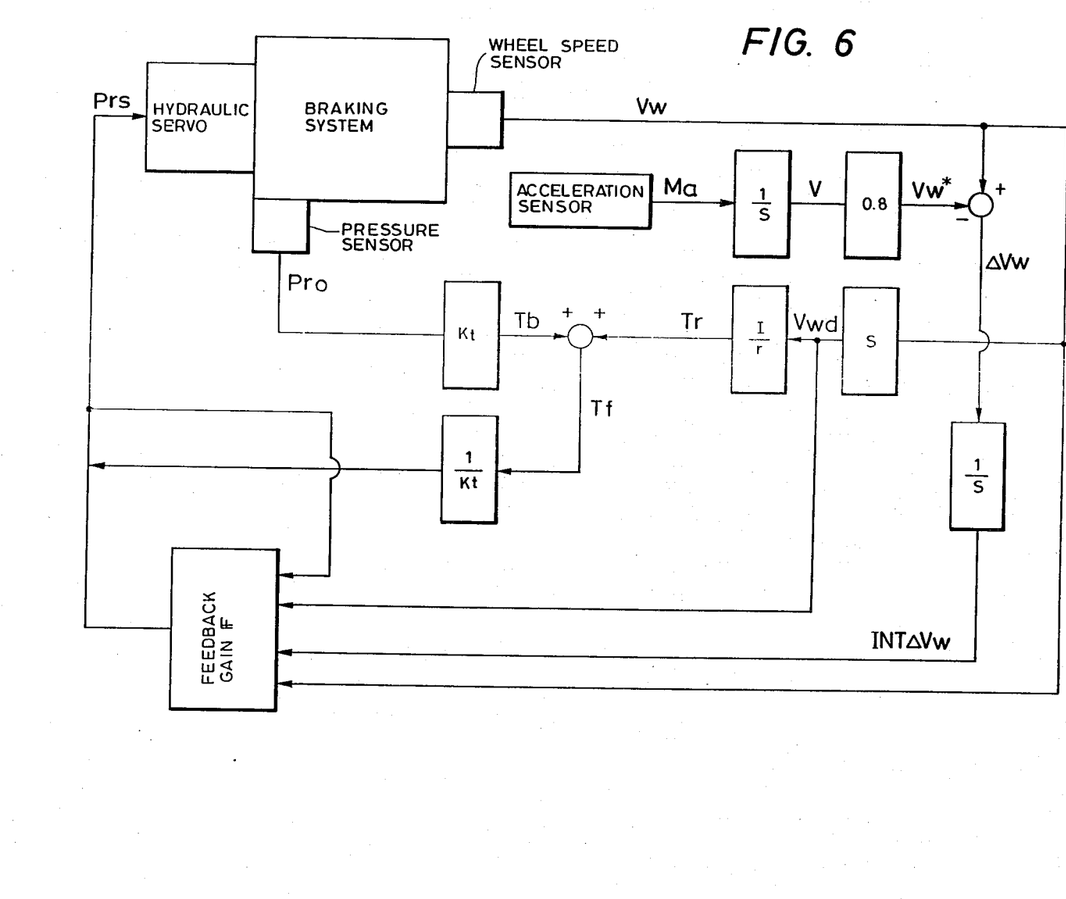
FIG. 6 is a signal flow diagram showing the control system in the embodiment.

FIG. 6 is a signal flow diagram of the control system in this embodiment. The hydraulic pressure is supplied from the hydraulic pressure servo to the braking system and the supplied hydraulic pressure pro is detected by the hydraulic pressure sensor. The speed Vw of the wheel is also detected by the wheel speed sensor. The detection value pro of the hydraulic pressure sensor is converted to the braking torque Tb applied to the wheel, using a coefficient Kt determined in accordance with the structure and characteristic of the hydraulic pressure braking device. On the other hand, the detection value Vw of the wheel speed sensor is converted to the wheel acceleration Vwd by the differential process and then converted to the rotational torque Tr of the wheel on the basis of the effective radius r and rotational moment of inertia. The frictional torque Tf that the wheel receives from the road is obtained on the basis of the difference between the absolute value of the rotational torque Tr and the absolute value of the braking torque Tb. The frictional torque Tf is converted to the hydraulic pressure on the basis of 1/Kt so as to obtain the initial command hydraulic pressure. Furthermore, the vehicle acceleration Ma is obtained by an acceleration sensor attached to the motor vehicle and the vehicle speed V is obtained by the integral of the vehicle acceleration Ma. Here, the slip ratio to provide the highest braking efficiency is set to 20% and the target wheel speed Vw* is derived from the vehicle speed V. INTΔVw is obtained by integrating the difference ΔVw between the target wheel speed Vw* and the detection value Vw of the wheel speed sensor.

Of these obtained factors, the previous command hydraulic pressure prs, wheel speed Vw, wheel acceleration Vwd, integral value INTΔVw of the difference ΔVw between Vw and Vw* are multiplied by the optimal feedback gain F so as to obtain the present command hydraulic pressure prs.

Figure 7:
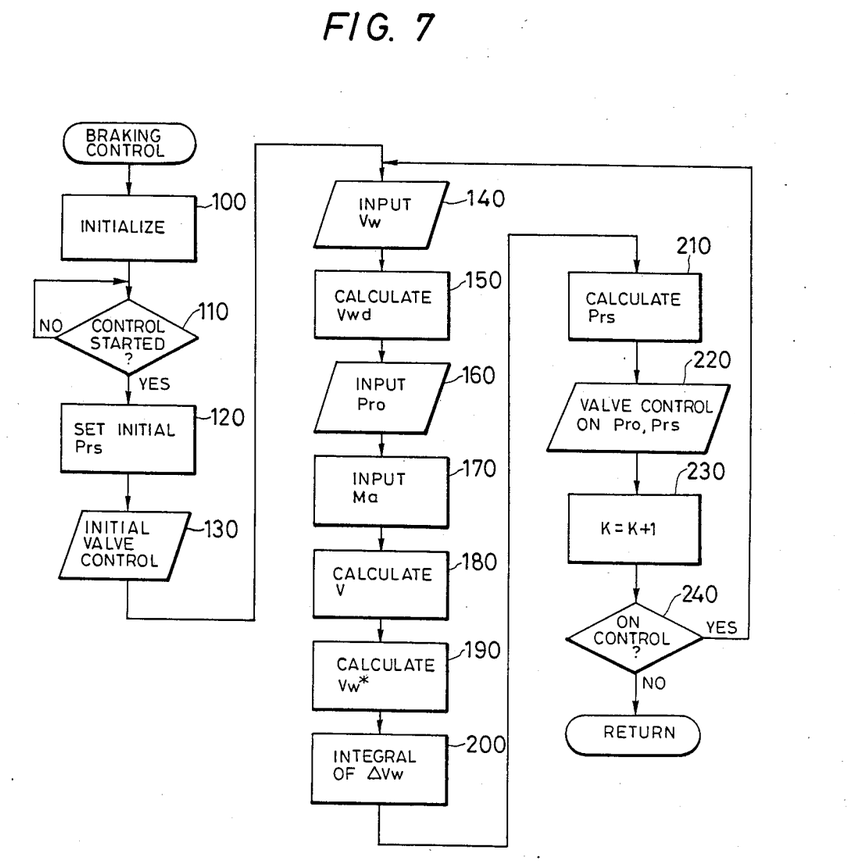
FIGS. 7 and 8 are flow charts showing processes for the embodiment which is performed by a control unit.

FIG. 7 is a flow chart showing a braking control performed by the ECU 40 which starts the execution in response to power-on due to an ignition key, the ECU 40 concurrently performing other operations such as detection of failures. The routine begines with a step 100 to initialize memories and so on, followed by a step 110 to check the start of control. In this embodiment, the start of control is determined when the slip ratio exceeds 8%. This is based on the conditions that the control target slip ratio is 20%, the response time lag occurs in the hydraulic pressure servo, the anti-skid control is desired not to be started except rapid braking operation when the vehicle runs on a high μ road, and the anti-skid control is desired to be started as quick as possible when the vehicle runs on a low μ road. If the decision in the step 110 is "YES", control goes to a subsequent step 120 to calculate the initial command hydraulic pressure prs in response to the start of control. If not, the step 110 is executed repeatedly. The step 120 is followed by a step 130 to control the three-position valve to generate the initial command hydraulic pressure prs. In a step 140, the wheel speeds Vw of the respective wheels are read from the wheel speed sensors 15, 16 and 22. In a step 150, the wheel acceleration Vwd of each of the wheels is calculated on the basis of the read wheel speed Vw in accordance with the following equation (16).

$$Vwd(k+1) = \{Vw(K+1) - Vw(k)\}/T \quad (16)$$

where T is the sampling interval of the wheel speed Vw and is the time that the process of the step 140 is again performed.

In a step 160, the hydraulic pressures pro supplied to the hydraulic pressure braking devices 11, 12, 13 and 14 are read from the hydraulic pressure sensors 51, 52 and 53. In a step 170, the vehicle acceleration Ma is read from the acceleration sensor 54, followed by a step 180 to calculate the vehicle speed V on the basis of the read vehicle acceleration ma in accordance with the following equation (17).

$$V(k+1) = V(k) \cdot T \quad (17)$$

Subsequently, a step 190 is executed to calculate the target wheel speed Vw*, for providing the highest braking efficiency, in accordance with the following equation (18).

$$Vw^* = V \cdot (1 - SL) \quad (18)$$

where SL represents the slip ratio which may be determined to bring the frictional force to the maximum. It is appropriate that the slip ratio is varied in accordance with the vehicle speed at the time of start of control.

In a step 200, the integral value INTΔVw of the difference ΔVw between the the wheel speed Vw and the target wheel speed Vw* is calculated in accordance with the following equation (19).

$$INT\Delta Vw(k+1) = INT\Delta Vw(k) + \Delta Vw(k) \cdot T \quad (19)$$

Subsequently, a step 210 is executed to calculate the command hydraulic pressure prs for each of the respective wheels. Since the command hydraulic pressure prs corresponds to the control input, it can be obtained on the basis of the equation (14') as follows.

$$prs(k+1) = -\{G1 \cdot X(k) + G2 \cdot prs(k)\} \quad (20)$$

In a step 220, in order to control of the braking hydraulic pressure for each of the respective wheels on the basis of the command hydraulic pressure prs of the respective wheels, the control patterns of the three-position valves for the front-right wheel, front-left wheel and rear wheels are respectively selected and the corresponding control signals are supplied respectively to the three-position valves. That is, the three-position valves are driven so that the braking hydraulic pressure for each of the respective wheels becomes equal to each of the command hydraulic pressures prs(k+1) during the sampling time period T. A step 230 follows to increment k indicating the sampling time by one. A step 240 is then executed to determine whether the braking control is continued or not. For example, the determination is made on the basis of whether the brake pedal is depressed or whether the motor vehicle is stopped. If keeping the braking control, the operation flow returns to the step 140. If not, the present braking control is terminated.

Figure 8:
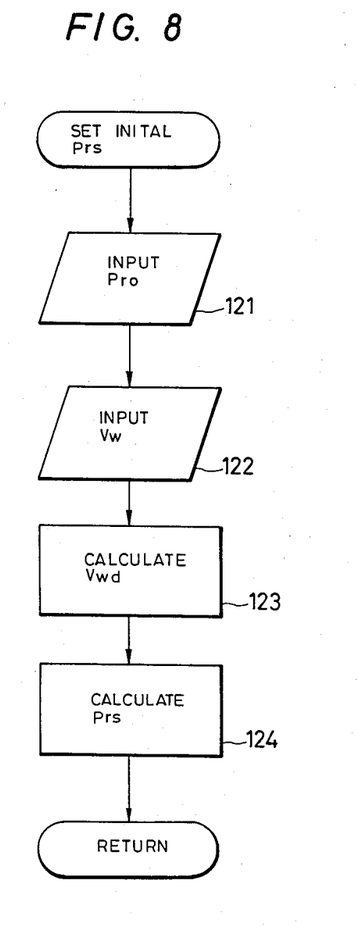

FIG. 8 is a flow chart for describing in detail the calculation of the initial command hydraulic pressure prs which is performed in the step 120 of FIG. 7. First, the 5 braking hydraulic pressure pro from the hydraulic pressure sensor is inputted in a step 121, followed by a step 122 to input the wheel speed Vw from the wheel speed sensor. A step 123 is then executed to calculate the wheel acceleration Vwd by means of the differential of the wheel speed Vw. In a step 124, the initial command hydraulic pressure prs is obtained by substituting the braking hydraulic pressure pro and the wheel acceleration Vwd to the above-mentioned equation (4). The calculation in the step 20 is made for each of the respective wheels. In the equation (4), the braking force corresponds to the hydraulic pressure pro and the braking force-to-torque conversion coefficient K corresponds to the hydraulic pressure-to-torque conversion coefficient Kt.

Figure 9:
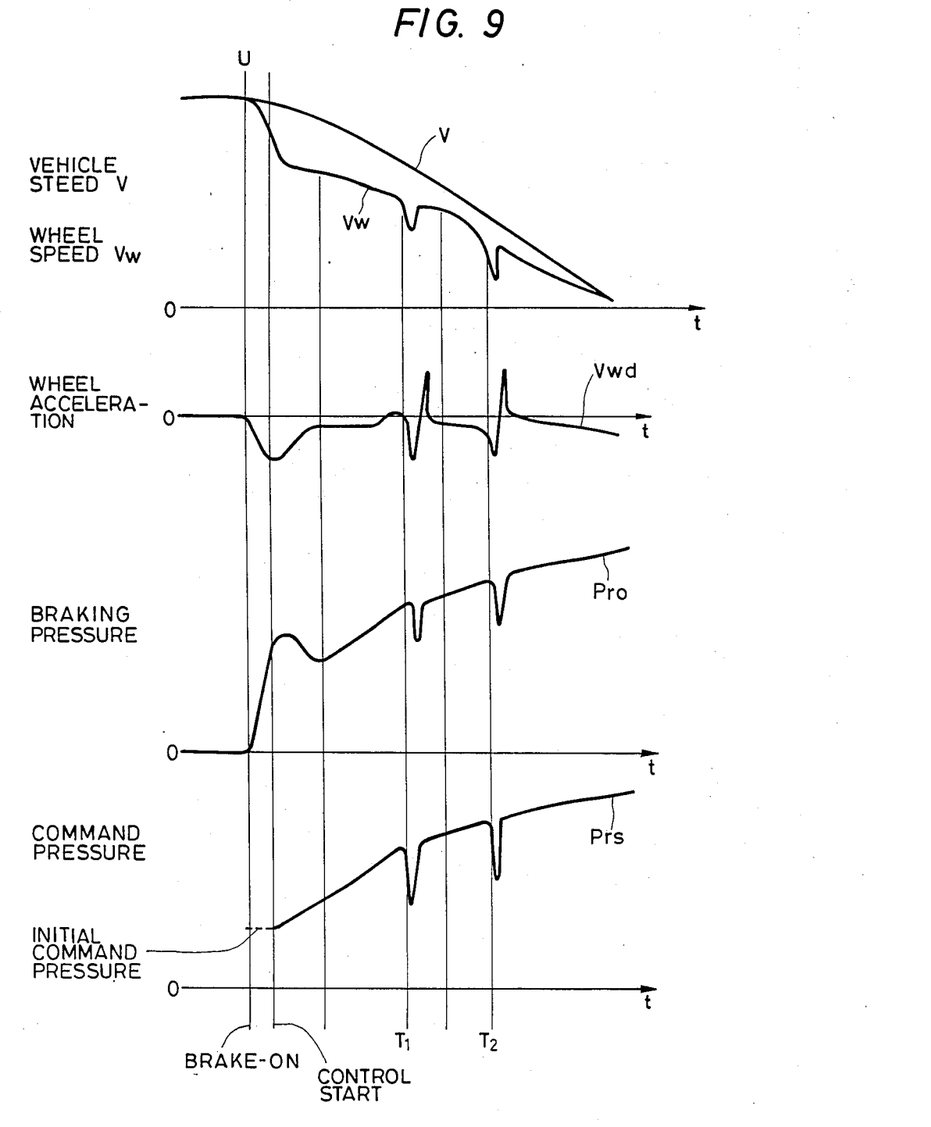
FIG. 9 is a graphic illustration for a better understanding of the embodiment.

FIG. 9 is an illustration for describing the variations of the vehicle speed, wheel speed, wheel acceleration, braking hydraulic pressure and command hydraulic pressure. In FIG. 8, when the slip ratio determined on the basis of the vehicle speed Vw and the wheel speed Vw exceeds 8%, the braking control is started in accordance with the flow chart of FIG. 7. As seen from FIG. 9, the wheel speed Vw is smoothly decreased without undershooting. During the decrease of the wheel speed Vw, variations occur in the vicinity of the times T1 and T2. This variations are due to variations of the road frictional coefficient, for example, joints of the road.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention. For example, although in the above description the braking control is performed independently in terms of the front wheels and together in terms of the rear wheels, the present invention can be applied to motor vehicles in which the front wheels are driven or in which the four wheels are driven or further in which only one wheel is driven. It is also appropriate that the calculation of the frictional force is made independently for all of the wheels. Furtehrmore, although in the above description the vehicle acceleration is obtained by dividing the sum of the forces applied to the vehicle body by the respective wheels by the vehicle mass, it is also appropriate that it is obtained by dividing the sum of forces by the load of each of the wheels to calculate the acceleration provided to the vehicle body by each of the wheels and by composing the accelerations with respect to the center of gravity of the vehicle body. In this case, it is possible to concurrently obtain the direction of the vehicle acceleration. Furthermore, it is also appropriate that the hydraulic pressure-to-torque convertion coefficient Kt is calculated experientially by the ECU 40 because of variation due to the state of the braking member, weather and so on. For example, Kt is calculated on the basis of the hydraulic pressure and wheel acceleration at the time of the soft braking in which the slip ratio is not relatively increased. In addition, although in the above description the control of the braking system is performed by the optimal feedback based on the modern control theory, the present invention is not limited thereby and various types of control systems may be applicable. Furthermore, although in the above-desceibed embodiment the control is started when the slip ratio assumes 8%, it is also approapriate that the control is started, for example, when the wheel acceleration becomes below a predetermined value.

What is claimed is:

1. An anti-skid control system for a vehicle with at least one wheel which is arranged to be braked by braking means, comprising:

wheel sensor means for sensing a rotational speed of said wheel, for generating a signal indicative of the sensed wheel speed, and for determining a rotational torque of said wheel;

brake sensor means for sensing a braking force of said braking means, for generating a signal indicative of the sensed braking force, and for determining a braking torque;

control start determining means for determining an occurrence of a start of said anti-skid control system, whereby said braking force on said wheel is decreased to prevent a locking of said wheel;

initial braking force determining means, coupled to said control start determining means and responsive to said occurrence of said start of said anti-skid control system, for determining an initial target braking force on the basis of said rotational torque of said wheel and said braking torque, said rotational torque and said braking torque being determined at said occurrence of said start of said anti-skid control system; and control means, coupled to said initial brake force determining means, for controlling said braking means so that said braking force becomes equal to said initial target braking force.

2. An anti-skid control system as claimed in claim 1, wherein said initial braking force determining means calculates a frictional force by combining the determined rotational torque with the determined braking torque and determining the initial target braking force so as to develop a braking torque which is equal to the calculated frictional force.

3. An anti-skid control system for a vehicle with at least one wheel which is arranged to be braked by braking means, comprising:

wheel sensor means for sensing a rotational speed of said wheel;

brake sensor means for sensing a braking force of said braking means;

control start determining means for determining an occurrence of a start of said anti-skid control system, whereby said braking force is decreased on the basis of said rotational speed;

initial braking force determining means for determining, in response to said occurrence of said start of said anti-skid control system, an initial target braking force at said occurrence of said start on the basis of said rotational speed and said braking force;

initial command means for outputting an initial braking force command signal to said braking means on the basis of said initial target braking force at the time of said occurrence of said start;

target wheel speed determining means for determining a target wheel speed after said initial braking force command signal is output by said initial command means;

command value calculating means for calculating a braking force command value as a function of a difference between said target wheel speed, said rotational speed and a previous braking force command value previously calculated by said command value calculating means; and control means for outputting a command signal to said braking means on the basis of said braking force command value.

* * * * *